United States Patent
Heusler et al.

[15] 3,679,676
[45] July 25, 1972

[54] THIADIAZABICYCLOALKANE COMPOUND

[72] Inventors: Karl Heusler, Basel; Bruno Fechtig, Reinach-Basel-land, both of Switzerland

[73] Assignee: Ciba-Geigy Corporation, Ardsley, N.Y.

[22] Filed: Nov. 23, 1970

[21] Appl. No.: 92,231

[30] Foreign Application Priority Data

Nov. 27, 1969 Switzerland .......................... 17673/69
June 5, 1970 Switzerland ............................ 8473/70

[52] U.S. Cl. ..................... 260/243 R, 260/239 A, 260/243 C
[51] Int. Cl. ........................................................ C07d 93/12
[58] Field of Search .................................. 260/243 R, 243 C

[56] References Cited

UNITED STATES PATENTS 3,534,029  10/1970  Beyerman.............................260/243

*Primary Examiner*—John M. Ford
*Attorney*—Harry Goldsmith, Joseph G. Kolodny and Mario A. Monaco

[57] ABSTRACT

The 4,4-dimethyl-5-thia-2,7-diazabicyclo[4.2.0]oct-2-en-8-one, which is obtained by splitting the esterified carboxyl group in a 6-amino-3-etherified hydroxycarbonylamino-2,2-dimethyl-penam compound, is useful as intermediate of compounds of the 7-amino-cephalosporanic acid type.

1 Claim, No Drawings

THIADIAZABICYCLOALKANE COMPOUND

The present invention relates to 4,4-dimethyl-5-thia-2,7-diazabicyclo[4.2.0d 1oct-2-en-8-one of formula

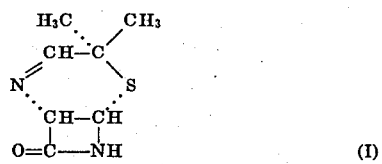

(I)

as a new thiadiazabicycloalkene compound.

The new compound is obtained in a surprising manner if in a penam compound of formula

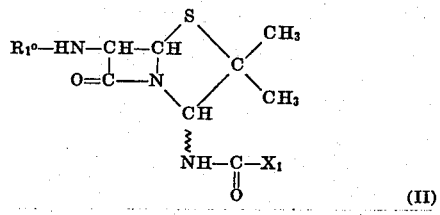

(II)

wherein the group $-C(=O)-X_1$ represents a substituted hydroxycarbonyl or mercaptocarbonyl group which can be split under neutral or acid conditions, and $R_1^o$ denotes hydrogen or an acyl radical $Ac^o$ of an organic acid which can be split off under the conditions of the process, the group $-C(=O)-X_1$ is split under neutral or weakly acid conditions with simultaneous or subsequent treatment with water and the 4,4-dimethyl-5-thia-2,7-diazabicyclo[4.2.0]oct-2-en-8-one is isolated.

An acylamino group $Ac^\bullet-NH-$ which can be split under the reaction conditions is for example a group of formula $-NH-C(=O)-X_1$, wherein $X_1$ has the above mentioned meaning, especially a group of formula $-NH-C(=O)-O-R_o^a$, $-NH-C(=O)-O-R_o^b$, $-NH-C(=O)-O-R_o^c$, $-NH-C(=O)-O-R_o^d$ or $-NH-C(=O)-O-R_o^e$, wherein $R_o^a$, $R_o^b$, $R_o^c$, $R_o^d$ and $R_o^e$ have the meanings given below, but can also represent any other acylamino group which can be split under the reaction conditions.

The splitting of the group $-C(=O)-X_1$ depends on the nature of this group, a treatment with at least 1 mol, normally an excess, of water being carried out simultaneously or subsequently. At the same time, acyl radicals $Ac^\bullet$ which can be split off under the reaction conditions are split off.

Substituted hydroxyl or mercapto groups $X_1$ are primarily etherified hydroxyl and mercapto groups, which together with the carbonyl grouping form a functionally modified, primarily esterified, carboxyl or thiocarboxyl group which can be split under neutral or weakly acid conditions.

The group $X_1$ for example represents the radical of formula $-O-R_o^a$, which together with the carbonyl grouping represents an esterified carboxyl group which can easily be split on treatment with chemical reducing agents under neutral or weakly acid conditions. In this group $R_o^a$ denotes a 2-halogen-lower alkyl radical, in which halogen preferably has an atomic weight of above 19. The radical can contain one, two or more halogen atoms, for example chlorine, bromine or iodine atoms, and in particular 2-chloro-lower alkyl radicals, but also 2-bromo-lower alkyl radicals contain several, preferably three, chlorine or bromine atoms, whilst a 2-iodo-lower alkyl radical primarily possesses one iodine atom only. The radical $R_o^a$ in particular represents a 2-polychloro-lower alkyl radical, such as 2-polychlorethyl radical, primarily the 2,2,2-trichlorethyl radical, as well as the 2,2,2-trichloro-1-methyl-ethyl radical, but can also for example denote a 2-polybromo-lower alkyl radical, such as 2,2,2-bromethyl radical, or a 2-iodo- lower alkyl radical, for example especially the 2-iodethyl radical.

A further group $X_1$, which together with the carbonyl grouping represents an esterified carboxyl group which can be easily split on treatment with chemical reducing agents under neutral or weakly acid conditions, is the group $-O-R_o^b$, wherein $R_o^b$ denotes an arylcarbonylmethyl group. In this, the aryl radical represents a bicyclic or polycyclic, but especially a monocyclic, optionally substituted aromatic hydrocarbon radical, for example an optionally substituted naphthyl group and primarily an optionally substituted phenyl group. Substituents of such groups are, for example, optionally substituted hydrocarbon radicals, such as lower alkyl radicals, for example methyl, ethyl or isopropyl radicals, and also trifluoromethyl, phenyl or phenyl-lower alkyl, for example benzyl or phenylethyl, radicals, or functional groups, such as free or functionally modified carboxyl groups, for example carboxyl, lower alkoxycarbonyl, such as methoxycarbonyl or ethoxycarbonyl, and also carbamoyl or cyano groups, optionally functionally modified, such as esterified, hydroxyl or mercapto groups, for example halogen atoms, or etherified hydroxyl or mercapto groups, such as lower alkoxy groups, for example methoxy, ethoxy, n-propoxy, isopropoxy, n-butoxy or tert.-butoxy groups, and/or optionally substituted amino groups, such as di-lower alkylamino groups, for example dimethyl amino or diethylamino groups, or lower alkanoylamino groups, for example acetylamino groups.

The methyl part of an arylcarbonylmethyl radical $R_o^b$ is preferably unsubstituted, but can optionally possess, as a substituent, an organic radical, for example an optionally substituted aliphatic hydrocarbon radical, such as a lower alkyl group, for example a methyl, ethyl, n-propyl, isopropyl, n-butyl or tert.-butyl group, or a cycloaliphatic, aromatic or araliphatic radical, such as an aryl group, for example an optionally substituted phenyl group, as well as an optionally substituted cycloalkyl group, for example a cyclohexyl group, or an optionally substituted phenyl-lower alkyl group, for example benzyl group.

An arylcarbonylmethyl radical $R_o^b$ is preferably the unsubstituted phenacyl radical, but can also be a phenacyl radical which is substituted in the aromatic part, such as a phenacyl radical substituted by lower alkyl groups, for example methyl groups, lower alkoxy groups, for example methoxy groups, or halogen atoms, for example fluorine, chlorine or bromine atoms.

The splitting of an esterified carboxyl group of formula $-C(=O)-X_1$, which in the starting material of formula II can also represent the radical $Ac^o$, and wherein $X_1$ represents the group $-O-R_o^a$ or $-O-R_o^b$, is effected by treatment with a chemical reducing agent in the presence of an at least equimolar amount of water, usually in the presence of an excess of water. The process is carried out under mild conditions, in most cases at room temperature or even with cooling.

Chemical reducing agents are for example suitable reducing metals, as well as reducing metal compounds, for example metal alloys or metal amalgams, and also strongly reducing metal salts. Zinc, zinc alloys, for example zinc copper, or zinc amalgam, and also magnesium are particularly suitable, and these are advantageously used in the presence of hydrogen-releasing agents which together with the metals, metal alloys and metal amalgams can generate nascent hydrogen, zinc, for example, advantageously in the presence of acids, such as organic carboxylic acids, for example lower alkanecarboxylic acids, primarily acetic acid, or acid agents, such as ammonium chloride or pyridine hydrochloride, preferably with the addition of water, and also in the presence of alcohols, especially aqueous alcohols, such as lower alkanols, for example methanol, ethanol or isopropanol, which can optionally be used together with an organic carboxylic acid, and alkali metal amalgams, such as sodium amalgam or potassium amalgam, or aluminum amalgam, in the presence of moist solvents such as ethers or lower alkanols.

Strongly reducing metal salts are primarily chromium-II compounds, for example chromium-II chloride or chromium-II acetate, which are preferably used in the presence of aqueous media containing organic solvents which are miscible with water, such as lower alkanols, carboxylic acids, such as lower alkane-carboxylic acids or derivatives, such as optionally substituted, for example lower alkylated, amides thereof, or ethers, for example methanol, ethanol, acetic acid, dimethylformamide, tetrahydrofurane, dioxane, ethylene glycol dimethyl ether or diethylene glycol dimethyl ether.

In the above reduction process, care must be taken that the C = N double bond in the product of the process is not reduced further than that after rearrangement 3- isopropyl-4-thia-2,6-diazabicyclo[3,2,0]-heptan-7-one is formed.

The group $X_1$ can also represent the radical of formula —O—$R_o^c$, which together with the carbonyl grouping represents an esterified carboxyl group which can easily be split on irradiation under neutral or weakly acid conditions. In this group, $R_o^c$ represents an aryl methyl group, wherein aryl denotes a bicyclic or polycyclic, but especially a monocyclic, preferably substituted aromatic hydrocarbon radical. Such an aryl radical is primarily an optionally substituted phenyl group, but can also be a naphthyl group, such as a 1- or 2-naphthyl group. Substituents of such groups are, for example, optionally substituted hydrocarbon radicals, such as lower alkyl, phenyl or phenyl-lower alkyl radicals, which can optionally contain functional groups, such as those given below, as substituents, or, primarily, functional groups, such as free or functionally modified carboxyl groups, for examply carboxy, lower alkoxycarbonyl, such as methoxycarbonyl or ethoxycarbonyl carbamoyl or cyano groups, optionally substituted amino groups, such as di-lower alkylamino groups, or acyl groups, such as lower alkanoyl groups, for example acetyl groups, but especially optionally functionally modified, for example esterified, hydroxyl or mercapto groups, such as acyloxy groups for example lower alkanoyloxy groups, such as acetoxy groups, or halogen atoms, for example fluorine, chlorine or bromine atoms, primarily etherified hydroxyl or mercapto groups, such as lower alkoxy groups, for example methoxy, ethoxy, n-propoxy, isopropoxy, n-butoxy or tert.-butoxy groups, and also lower alkylmercapto groups, for example methylmercapto or ethylmercapto groups (which in the case of the preferred phenyl radical primarily are in the 3-, 4- and/or 5-position) and/or above all nitro groups (in the case of the preferred phenyl radical, preferably in the 2-position).

The methyl part of an arylmethyl radical $R_o^c$ can optionally, for example like the methyl part in an arylcarbonylmethyl radical $R_o^b$ possess a substituent preferably an optionally substituted hydrocarbon radical.

A radical $R_o^c$ is preferably an optionally substituted α-phenyl-lower alkyl radical or benzhydryl radical, such as a 1-phenylethyl or benzhydryl radical, above all a benzyl radical, which is optionally substituted by lower alkoxy groups, such as methoxy groups, preferably in the 3-, 4- and/or 5-position, and/or by nitro groups, preferably in the 2-position, and especially the 3- or 4-methoxybenzyl, 3,5-dimethoxybenzyl, 2-nitrobenzyl or 4,5-dimethoxy-2-nitrobenzyl radical.

In a starting material of formula I, wherein $X_1$ represents a radical of formula —O—$R_o^c$, the group of formula —C( = O)—$X_1$ can be split by irradiation with light, preferably with ultraviolet light. In doing so, light of longer or shorter wavelengths is used, depending on the nature of the substituent $R_o^c$. Thus, for example, groups of formula —C( = O)—O—$R_o^c$, wherein $R_o^c$ represents an arylmethyl radical, especially a benzyl radical, which is substituted by a nitro group in the 2-position of the aryl radical and optionally possesses further substituents, such as lower alkoxy groups, for example methoxy groups, for example the 4,5-dimethoxy-2-nitrobenzyl radical, are split by irradiation with ultraviolet light of a wavelength range of above 290 mμ, while those in which $R_o^c$ represents an arylmethyl radical, for example benzyl radical, which is optionally substituted in the 3-, 4- and/or 5-position, for example by lower alkoxy groups and/or nitro groups, are split by irradiation with ultraviolet light with a wavelength range of below 290 mμ. In the first case, one uses a high pressure mercury vapor lamp, a Pyrex glass being preferably employed as a filter, and one works, for example in the case of a main wavelength range of about 315 mμ, while in the latter case a low pressure mercury vapor lamp, for example with a main wavelength range of about 254 mμ is employed.

The irradiation reaction is carried out in the presence of a suitable polar or non-polar organic solvent or mixture; solvents are, for example, optionally halogenated hydrocarbons, such as optionally chlorinated lower alkanes, for example methylene chloride, or optionally chlorinated benzenes, for example benzene, and also alcohols, such as lower alkanols, for example methanol, or ketones, such as lower alkanones, for example acetone. The reaction is preferably carried out at room temperature or, if necessary, with cooling, usually in an inert gas atmosphere, for example a nitrogen atmosphere. The reaction is preferably carried out in the presence of water; however, it is also possible to treat the irradiation product subsequently with water, for example by effecting the working up of the product obtained in the presence of water.

A group $X_1$ can also represent the radical of formula —O—$R_o^d$, which together with the carbonyl grouping forms an esterified carboxyl group which can be easily split under acid conditions. Such a radical $R_o^d$ is primarily a methyl group, which is monosubstituted by a carbocyclic aryl group possessing electron-donating substituents or by a heterocyclic group of aromatic character possessing oxygen atoms or sulphur atoms as ring members, or, in an oxacycloaliphatic or thiacycloaliphatic radical, denotes the ring member which represents the α-position relative to the oxygen atom or sulphur atom.

A carbocyclic aryl group which in the aryl radical contains electron-donating substituents is a bicyclic or polycyclic, especially monocyclic, aryl radical, for example naphthyl radical and primarily phenyl radical. Electron-donating substituents which are preferably in the p-position and/or o-position of the aryl radical are, for example, free or preferably functionally modified, such as esterified and primarily etherified, hydroxyl groups, such as lower alkoxy groups, for example methoxy groups, and also ethoxy or isopropoxy groups, as well as appropriate free or functionally modified mercapto groups, and also aliphatic, cycloaliphatic, aromatic or araliphatic, optionally suitably substituted, hydrocarbon radicals, especially lower alkyl groups, for example methyl or tert.-butyl groups, or aryl groups, for example phenyl groups.

A heterocyclic group of aromatic character containing oxygen atoms or sulphur atoms as ring members can be bicyclic or polycyclic, but is primarily monocyclic and above all represents a furyl radical, for example 2-furyl radical, or a thienyl radical, for example 2-thienyl radical.

An oxacycloaliphatic and thiacycloaliphatic radical linked in the α-position is primarily a 2-oxacycloalkyl or 2-thiacycloalkyl group, or a 2-oxacycloalkenyl or 2-thiacycloalkenyl group, in which the methyl group $R_o^d$ represents the ring member adjacent to the ring oxygen atom or ring sulphur atom, and which preferably contains four to six ring carbon atoms, primarily a 2-tetrahydrofuryl, 2-tetrahydropyranyl or 2,3-dihydro-2-pyranyl radical or a corresponding sulphur analogue.

Preferred radicals $R_o^d$ are 4-methoxybenzyl and 3,4-dimethoxybenzyl radicals, as well as 2-tetrahydrofuryl, 2-tetrahydropyranyl or 2,3-dihydro-2-pyranyl groups.

An esterified carboxyl group of formula —C( = O)—$X_1$ which can also be split under acid conditions contains, as the radical $X_1$, the group of formula —O—$R_o^e$, wherein $R_o^e$ is a methyl group displaying multiple substitution and in particular containing several optionally substituted and/or polyvalent hydrocarbon radicals, such as a lower alkyl group with multiple branching in the α-position, preferably the tert.-butyl or tert.-pentyl group, and also a cycloalkyl group, for example adamantyl group, a polyarylmethyl group, for example benzhydryl or trityl group, or a 2-(4-biphenylyl)-2-propyl group.

In a starting material of formula I, wherein $X_1$ represents a group of formula —O—$R_o^d$ or —O—$R_o^e$, the grouping of formula —C( = O)—O—$R_o^d$ or —C( = O)—O—$R_o^e$ can be split by treatment with an acid agent, especially with an acid, such as a strong organic carboxylic acid, for example an optionally substituted lower alkanecarboxylic acid which preferably contains halogen atoms, such as acetic acid or trifluoracetic acid, and also with formic acid or a strong organic sulphonic acid, for example p-toluenesulphonic acid. Herein, an excess of an acid reagent which is liquid under the reaction conditions is usually employed as the diluent and the process is carried out in the presence of at least an equivalent quantity of water, either at room temperature or with cooling, for example to about −20°C to about +10°C.

The 4,4-dimethyl-5-thia-2,7-diazabicyclo[4.2.0]oct-2-en-8-one can be isolated from mixtures obtainable according to the process by methods of separation which are in themselves known, for example by fractional crystallization, adsorption chromatography (column chromatography or thin layer chromatography) or other suitable separation processes and can for example, especially in the case of the splitting of groupings of formula —C(= O)—X$_1$, in which X$_1$ represents a group of formula —O—R$_o^a$ or —O—R$_o^b$, be separated from the 3-isopropyl-4-thia-2,6-diazabicyclo[3,2,0]heptan-7-one which may be formed.

The above process also comprises those embodiments, according to which compounds arising as an intermediate product are used as starting substances and the remaining process steps are carried out with these, or according to which the process is stopped at any stage; furthermore, starting substances can be used in the form of derivatives or formed during the reaction.

The starting substances of formula II used according to the process can for example be manufactured if a penam-3-carboxylic acid compound IIIa of formula

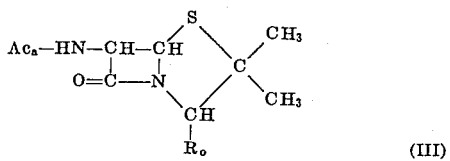

(III)

in which Ac$_a$ represent the acyl radical of an organic carboxylic acid, wherein free functional groups, such as hydroxyl, mercapto and especially amino and carboxyl groups, are optionally protected, for example by acyl groups or in the form of ester groups, and R$_o$ represents a carboxyl group —C(= O)—OH (compound IIIa), or a salt thereof, is converted into the corresponding acid azide compound of formula III, wherein R$_o$ represents the azidocarbonyl radical —C(= O)—N$_3$ (compound IIIb), the latter compound is converted, with elimination of nitrogen, into the corresponding isocyanate compound of formula III, wherein R$_o$ denotes the isocyanato group —N = C = O (compound IIIa), and simultaneously or subsequently treated with a compound of formula H—X$_1$ (IV), and, in a resulting compound, an acyl radical Ac$_a$ which cannot be split off under the conditions of the process according to the invention is replaced by hydrogen and, if desired, a resulting compound is converted into another compound of formula II and/or, if desired, a resulting isomer mixture is resolved into the individual isomers.

An acyl group Ac$_a$ occurring in the compounds of formula III can represent any acyl radical of an organic carboxylic acid with optionally protected functional groups, primarily an acyl radical contained in naturally occurring or biosynthetically produced N-acyl derivatives of 6-amino-penam-3-carboxylic acid or 7-amino-ceph-3-em-4-carboxylic acid compounds, such as a monocyclic aryl-acetyl or aryloxyacetyl radical, and also an optionally substituted lower alkanoyl or lower alkenoyl radical, for example the 4-hydroxy-phenylacetyl, hexanoyl, octanoyl, 3-hexenoyl, 5-amino-5-carboxy-valeroyl, n-butylmercaptoacetyl or allylmercaptoacetyl radical, especially the phenylacetyl or phenyloxyacetyl radical, or can represent an acyl radical which can be easily split off, preferably under acid conditions, for example by treatment with trifluoracetic acid, especially the acyl radical of a half-ester of carbonic acid, such as lower alkoxycarbonyl radical, for example tert.-butoxycarbonyl or tert.-pentoxycarbonyl radical, cycloalkoxycarbonyl radical, for example adamantyloxycarbonyl radical, phenyllower alkoxycarbonyl radical, for example diphenylmethoxycarbonyl radical, or α-4-biphenylyl-α-methylethoxycarbonyl radical, or furyl-lower alkoxycarbonyl radical, for example furfuryloxycarbonyl radical, which can easily be split off under acid conditions, for example by treatment with trifluoracetic acid.

The conversion of an acid compound IIIa or of a suitable salt, especially an ammonium salt, into the corresponding acid azide IIIb can for example be effected by conversion into a mixed anhydride (for example by treatment with a halogenoformic acid lower alkyl ester, such as chloroformic acid ethyl ester, or with trichloracetic acid chloride in the presence of a basic agent, such as triethylamine or pyridine) and treatment of such an anhydride with an alkali metal azide, such as sodium azide, or an ammonium azide, for example benzyltrimethylammonium azide. The acid azide compound IIIb thus obtainable can be converted into the desired isocyanate compound IIIc in the absence or presence of a compound of formula IV under the reaction conditions, for example on warming, and the isocyanate compound usually does not require isolation and can be directly converted, in the presence of a compound of formula IV, into the desired starting material.

The reaction with a compound of formula IV, especially with an alcohol of formula R$_o^a$—OH, R$_o^b$—OH, R$_o^c$—OH, R$_o^d$—OH or R$_o^e$—OH, such as with a 2-halogenethanol R$_o^a$—OH, for example with 2,2,2-trichlorethanol or 2-bromethanol, an arylcarbonylmethanol R$_o^b$—OH, for example phenacyl alcohol, or an arylmethanol R$_o^c$—OH or R$_o^d$—OH, for example 4,5-dimethoxy-2-nitrobenzyl alcohol or 4-methoxybenzyl alcohol, is optionally carried out in an inert solvent, for example in a halogenated hydrocarbon, such as carbon tetrachloride, chloroform or methylene chloride, or in an aromatic solvent, such as benzene, toluene or chlorobenzene, preferably with warming.

An acyl group Ac$_a$ which cannot be split off under the reaction conditions of the process according to the invention, especially an acyl group which differs from the radical of formula —C(= O)—X$_1$, can be split off in a manner which is in itself known, if desired after protection of free functional groups (for example by acylation, esterification such as silylation and the like) or after liberation of protected functional groups (for example by hydrolysis, reduction or treatment with an acid), such as by treatment with an imide-halide-forming agent, such as a suitable inorganic acid halide, for example phosphorus pentachloride, preferably in the presence of a basic agent, such as pyridine, reaction of the resulting imide-halide with an alcohol, such as a lower alkanol, for example methanol, and splitting of the imino-ether formed in an aqueous medium, preferably under acid conditions. The acyl radical of a suitable half-ester of carbonic acid, such as of a carbo-lower alkoxy radical which can be split under acid conditions, for example the tert.-butyloxycarbonyl, tert.-pentyloxy-carbonyladamantyloxy-carbonyl or diphenylmethoxy-carbonyl radical, can for example be split off with a suitable acid reagent, such as trifluoracetic acid.

Starting substances of formula II obtainable according to the process can be converted into one another. Thus, for example, an aliphatically bonded chlorine atom and especially a bromine atom, in the radical X$_1$, such as in the 2-bromethoxy radical, can for example be replaced by an iodine atom by treatment with a suitable iodine salt, such as an alkali metal iodide, for example potassium iodide, in a suitable solvent, such as acetone; for example, the 2-bromethyl radical can be converted into the 2-iodethyl radical.

It is further possible, in starting substances of formula II, wherein R$_1^o$ denotes hydrogen, to replace the latter in a manner which is in itself known by an acyl group Ac$^o$ which can be split off under the reaction conditions and is replaceable by hydrogen. Herein, the customary acylating agents are used, especially reactive derivatives of suitable acids, if necessary in the presence of a basic agent, such as an organic tertiary base, for example triethylamine or pyridine. Reactive derivatives of acids are anhydrides, including mixed anhydrides, in particular anhydrides which can be prepared with halogenoformic acid esters, for example chloroformic acid ethyl ester, and also halides, primarily fluorides or chlorides, or reactive esters, such as esters of acids with alcohols or phenols containing electron-attracting groupings, or with N-hydroxy compounds, for example cyanomethanol, p-nitrophenol or N-hydroxysuccinimide. The acylation can also be carried out stepwise, for example by treating a resulting compound of formula II, wherein $R_1^o$ represents hydrogen, with a carbonic acid dihalide, especially phosgene, and reacting a resulting compound of formula II, wherein $R_1$ denotes a halogenocarbonyl group, with a suitable alcohol, for example an optionally substituted lower alkanol, such as tert.-butanol, 2,2,2-trichlorethanol or phenacylalcohol.

The compound of formula I represents a valuable intermediate product which can, in a simple manner, be converted into starting substances which are in particular suitable for the manufacture of pharmacologically valuable compounds, for example of the 7-N-acylamino-cephalosporanic type, which possess effects against micro-organisms, such as gram-positive and gram-negative bacteria.

Thus it is possible to convert the compound of formula I, by reduction of the —N = CH— double bond, into 3-isopropyl-4-thia-2,6-diazabicyclo[3.2.0]heptan-7-one of formula

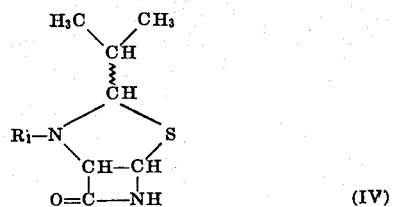

wherein $R_1$ represents hydrogen, and in this compound to replace the hydrogen $R_1$ by an acyl radical Ac, primarily an acyl radical Ac′ which can easily be split off, especially under acid conditions, such as the tert.-butoxycarbonyl radical. If a compound of formula IV, wherein $R_1$ represents an acyl radical Ac, especially an acyl radical Ac′, is reacted, customarily in the absence of a condensation agent, with a 3,3-diformyl-acrylic acid $R_2^A$-ester of formula

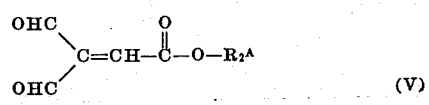

wherein $R_2^A$ represents an organic radical which together with the carboxyl grouping forms an esterified carboxyl group which can easily be split, or with a tautomer thereof, and a resulting 2-(2-Ac-3-isopropyl-7-oxo-2,6-diaza-4-thia-6-bicyclo[3,2,0]heptyl)-3,3-diformyl-propionic acid $R_2^A$-ester of formula

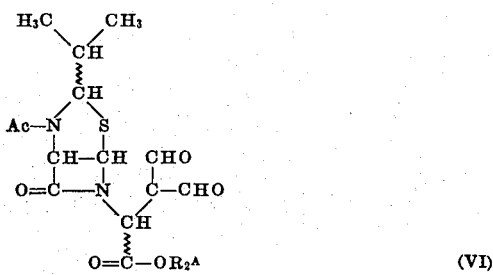

is reacted with an acid agent, a 7-amino-3-formyl-ceph-2-em-4-carboxylic acid $R_2^A$-ester of formula

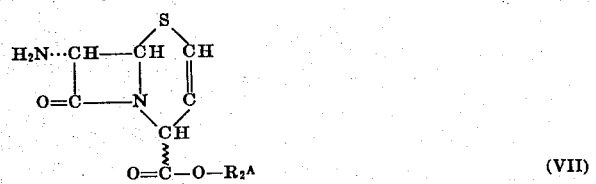

is obtained. This can be converted into 7-aminocephalosporanic acid and its N-acyl derivatives, for example according to the method described in Austrian Pat. No. 264,537.

In a compound of the formula, the —N = CH— double bond is reduced by exhaustive reduction, for example by treatment with an excess of a chemical reducing agent, such as a reducing metal, or a reducing metal compound, for example a metal alloy or metal amalgam, preferably in the presence of a hydrogen-releasing agent, such as one of the reducing agents described above, especially zinc in the presence of acetic acid, preferably aqueous acetic acid.

A hydrogen atom $R_1$ in a compound of formula IV is replaced by an acyl group Ac in a manner which is in itself known, for example according to the acylation reaction described above. A tert.-butoxycarbonyl group can for example be introduced by treatment with fluoroformic acid tert.-butyl ester, or by treatment with phosgene and reaction of a compound of formula IV, wherein $R_1$ represents the chlorocarbonyl group, with tert.-butanol.

In a compound of formula V, an organic radical $R_2^A$ together with the carboxyl grouping forms an esterified carboxyl group which can easily be split. $R_2^A$ here especially represents one of the radicals $R_o^a$, $R_o^b$, $R_o^c$, $R_o^d$ and $R_o^e$ having the above-mentioned meanings, especially the 2,2,2-trichlorethyl, 2-iodethyl, phenacyl or tert.-butyl group, and also an organic radical $R_o^f$ which with the carboxyl grouping forms an esterified carboxyl group which can be easily split hydrolytically, possibly under weakly acid or weakly basic conditions, such as a hydrocarbon radical, in particular an aliphatic, aromatic or araliphatic hydrocarbon radical, which is substituted by electron-attracting groups, wherein electron-attracting groups are for example nitro groups, optionally functionally modified carboxyl groups or sulpho groups, such as cyano groups or sulphamoyl groups, halogen atoms or acylamino groups, such as for example the 4-nitrophenyl, 2,4-dinitrophenyl, 4-nitrobenzyl, 2,5,6-trichlorophenyl, 2,3,4,5,6-pentachlorophenyl, phthaliminomethyl or succinimomethyl group, or represents an organic radical $R_o^g$ which together with the carboxyl grouping forms an esterified carboxyl group which can be split under physiological conditions, such as a methyl radical substituted by an acyloxy group, for example a lower alkanoyloxy group, especially an acetoxy group.

The reaction of a compound of formula IV, wherein $R_1$ represents an acyl radical Ac, especially an acyl radical Ac′ which can easily be split off under acid conditions, with a diformylacrylic acid $R_2^A$-ester of formula V is carried out in a manner which is in itself known, for example by heating the reaction mixture to temperatures at which a decomposition of the olefine of formula V, which can also be employed in the hydrated form, that is to say as the 3,3-diformyl-lactic acid $R_2^A$-ester of formula

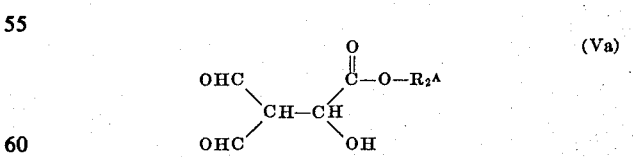

and loses water under the reaction conditions, is largely avoided, that is to say at about 50° C to about 120° C, usually in the presence of a solvent, such as a suitable, optionally halogenated, aliphatic or aromatic hydrocarbon, for example n-octane or xylene, or of a suitable ether, for example 1,2-dimethoxyethane, and/or in a inert gas atmosphere, such as a nitrogen atmosphere, and/or under elevated pressure.

Acid agents which effect the ring opening of the 5-membered ring and the ring closure to give the 6-membered sulphur-nitrogen ring in a compound of formula VI are primarily inorganic or strong organic, oxygen-containing acids, as well as aprotic Lewis acids of the boron trifluoride type and their complexes. Inorganic oxygen-containing acids are, for example, sulphuric acid, phosphoric acid or perchloric acid, whilst strong organic oxygen-containing acids are strong organic carboxylic acids, such as substituted lower alkanecarboxylic acids, for example halogen-lower alkanecarboxylic acids, and above all trifluoracetic acid, or strong organic sulphonic acids, such as p-toluenesulphonic acid. Aprotic Lewis acids of the boron trifluoride type are for example boron trifluoride itself, as well as its complexes, for example with ether, that is to say boron trifluoride etherate, or with hydrofluoric acid, that is to say fluoboric acid, as well as tin tetrachloride. Suitable mixtures of acids can also be used.

The above ring opening and ring closing reaction is carried out in the absence or presence of suitable solvents, (it being possible for certain acid agents, such as trifluoracetic acid, simultaneously to serve as solvents), with cooling, at room temperature or with warming, if necessary in a nitrogen atmosphere and/or in a closed vessel.

An acyl radical Ac' which can easily be split off under acid conditions, for example the tert.-butoxycarbonyl radical, is usually also split off under the reaction conditions.

In contrast to the known 2-$R_1$-4-thia-2,6-diazabicyclo[3.2.0]heptan-7-one compounds, of which the carbon atom in the 4-position is disubstituted, for example by lower alkyl groups, especially methyl groups, which can also be used in the above reaction sequence for the manufacture of compounds of formula VII, the compounds of formula I can be manufactured in a simple manner from the easily accessible starting substances of the 6-N-acylamino penicillanic acid series, whereby the synthetic access to compounds of the 7-N-acylaminocephalosporanic acid type is significantly simplified.

A compound of formula IV, wherein $R_1$ represents hydrogen, can also be used as a starting substance for the manufacture of new compounds possessing antibiotic effects against gram-positive and gram-negative bacteria, and in particular as follows:

If the compound of formula IV, wherein $R_1$ represents hydrogen, is oxidized with a mercaptan-to-disulfide oxidizing agent optionally after treatment with water, a disulphide compound of formula

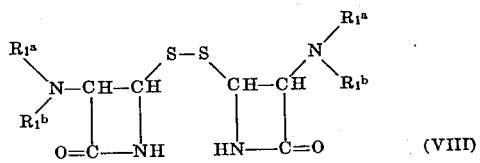

(VIII)

wherein $R_1^a$ and $R_1^b$ represent hydrogen or together represent a 1-isobutylidene group or an acid addition salt thereof is obtained. In a compound of formula VIII, the amino group is acylated, for example in accordance with the acylating process described above, a 1-isobutylidene group represented by the radicals $R_1^a$ and $R_1^b$ being split off simultaneously or subsequently, optionally in a modified form. A compound of formula VIII thus obtainable, wherein $R_1^a$ represents an acyl radical Ac and $R_1^b$ represents hydrogen, is reacted with ethylene oxide, with simultaneous treatment with a reducing agent, and a compound of formula

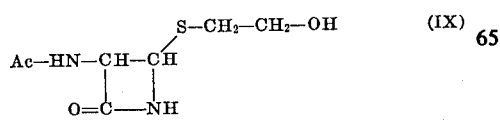

(IX)

is thus obtained, wherein the primary hydroxyl group is converted into a hydroxyl group esterified by the acyl radical of formula $-C(=O)-X_2$. Herein, $X_2$ represents an etherified hydroxyl or mercapto group, which together with the carbonyl grouping forms an esterified carboxyl group which can be split under mild conditions.

The compound of formula

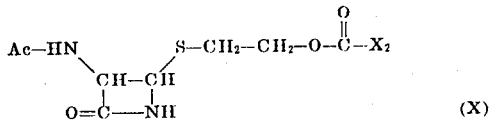

(X)

thus obtainable is reacted with a compound of formula

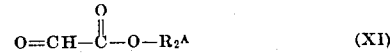

(XI)

wherein $R_2^A$ represents an organic radical of an alcohol which is preferably easily replaceable by hydrogen, or with a reactive derivative thereof. In the addition compound of formula

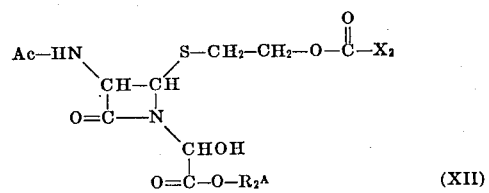

(XII)

the secondary hydroxyl group is converted into a reactive esterified hydroxyl group. The reactive ester of formula

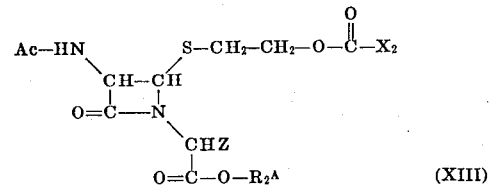

(XIII)

wherein Z represents a reactive esterified hydroxyl group, primarily a halogen atom, especially a chlorine or bromine atom, as well as an organic sulphonyloxy group, for example a 4-methylphenylsulphonyloxy or methylsulphonyloxy group, is reacted with a phosphine compound of formula

(XIV)

wherein each of the radicals $R_a$, $R_b$ and $R_c$ represents an optionally substituted hydrocarbon radical, and in this way, if necessary after splitting off the elements of an acid of formula H-Z (XVb) from a phosphonium salt compound of formula

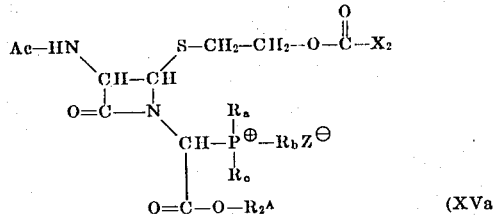

(XVa)

obtainable as an intermediate product, the phosphoranylidene compound of formula

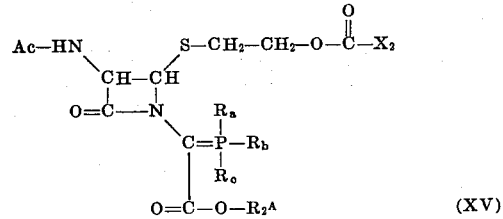

(XV)

is obtained, in which the esterified carboxyl grouping $-C(=O)-X_2$ is split. If, in a compound thus obtainable of formula

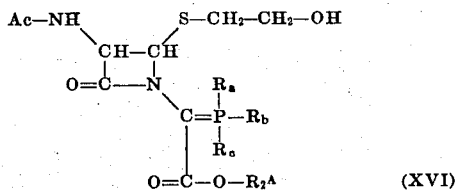

the carbinol group of formula —CH₂—OH is oxidized to a formyl group of formula —CHO, there are obtained, with simultaneous ring closure of an aldehyde compound of formula

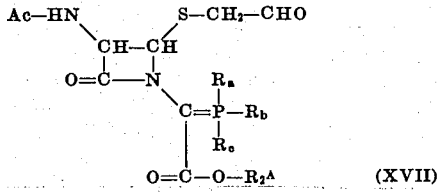

formed as an intermediate product, the ceph-3-em compounds of formula

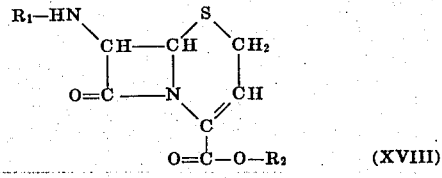

wherein $R_1$ represents an acyl radical Ac and $R_2$ represents the organic radical $R_2^A$ of an alcohol, and, if desired, the acyl group Ac can be split off and, in a compound thus obtainable, the free amino group can optionally be acylated and/or an ester grouping of formula —C( = O)—O—$R_2^A$ can be converted into the free carboxyl group or into a different ester grouping of formula —C( = O)—O—$R_2$, and a free carboxyl group can optionally be converted into an esterified carboxyl group of formula —C(= O)—O—$R_2$, and/or a resulting compound having a salt-forming group can be converted into a salt or a resulting salt into the free compound or into a different salt and/or a resulting isomer mixture can be separated into the individual isomers.

The compounds of formula XVIII possess valuable pharmacological properties or can be used as intermediate products for the manufacture of such. Compounds of formula XVIII wherein $R_1$ represents an acyl radical occurring in pharmacologically active N-acyl derivatives of 6-amino-penam-3-carboxylic acid compounds or 7-amino-ceph-3-em-4-carboxylic acid compounds and $R_2$ denotes hydrogen or an organic radical of an alcohol which can easily be split off under physiological conditions, are active against micro-organisms, such as grampositive bacteria, for example *Staphylococcus aureus*, and especially also against penicillin-resistant bacteria of this type, for example in dilutions of up to 0.0001 γ/ml, and against gram-negative bacteria, for example *Escherichia coli*.

An acyl radical contained in pharmacologically active N-acyl derivatives of 6-amino-penicillanic acid or 7-aminocephalosporanic acid is primarily the 2,6-dimethoxybenzoyl, tetrahydronaphthoyl, 2-methoxy-naphthoyl, 2-ethoxy-naphthoyl, cyclopentylcarbonyl, α-amino-cyclopentylcarbonyl or α-aminocyclohexylcarbonyl (optionally having a substituted amino group, for example a sulphoamino group optionally present in the salt form), benzyloxycarbonyl, hexahydrobenzyloxycarbonyl, 2-phenyl-5-methyl-4-isoxazolylcarbonyl, 2-(2-chlorophenyl)-5-methyl-4-isoxazolylcarbonyl, 2-(2,6-dichlorophenyl)-5-methyl-4-isoxazolylcarbonyl, phenylacetyl, phenacylcarbonyl, phenyloxacetyl, phenylthioacetyl, bromophenylthioacetyl, 2-phenyloxypropionyl, α-phenyloxy-phenylacetyl, α-methoxyphenylacetyl, α-ethoxy-phenylacetyl, α-methoxy-3,4-dichlorophenylacetyl, α-cyano-phenylacetyl, phenylglycyl (optionally having a substituted amino group, such as a sulphoamino group optionally present in the salt form), benzylthioacetyl, benzylthiopropionyl, α-carboxyphenylacetyl (optionally with a functionally modified carboxyl group, for example a carboxyl group present in the salt form), 2-pyridylacetyl, 4-amino-pyridiniumacetyl, 2-thienylacetyl, α-carboxy-2-thienylacetyl or α-carboxy-3-thienylacetyl (optionally with a functionally modified carboxyl group, for example a carboxyl group present in the salt form), α-cyano-2-thienylacetyl, α-amino-2-thienylacetyl or α-amino-3-thienylacetyl (optionally with a substituted amino group, for example a sulphoamino group optionally present in the salt form), 3-thienylacetyl, 2-furylacetyl, 1-imidazolylacetyl, 1-methyl-5-tetrazolylacetyl, 3-methyl-2-imidazolylthioacetyl, 1,2,4-triazol-3-yl-thioacetyl, propionyl, butyryl, hexanoyl, octanoyl, acrylyl, crotonoyl, 3-butenoyl, 2-pentenoyl, methoxyacetyl, methylthioacetyl, butylthioacetyl, allylthioacetyl, chloracetyl, bromacetyl, dibromacetyl, 3-chloropropionyl, 3-bromopropionyl, aminoacetyl, 5-amino-5-carboxy-valeryl (optionally with a substituted amino group and/or optionally functionally modified carboxyl group), azidoacetyl, carboxyacetyl, methoxycarbonylacetyl, ethoxycarbonylacetyl, bismethoxycarbonylacetyl, N-phenylcarbamoylacetyl, cyanacetyl, α-cyanopropionyl, 2-cyano-3-dimethylacrylyl or N-2-chlorethylcarbamoyl radical.

Compounds of formula XVIII wherein both radicals $R_1$ and $R_2$ represent hydrogen, or wherein $R_1$ represents hydrogen or an acyl radical Ac and $R_2$ represents an organic radical of an alcohol $R_2^A$ which together with the —C( = O)—O— grouping forms an esterified carboxyl group which can preferably be split easily, are valuable intermediate products, which can be converted in a simple manner, for example as described below, into the abovementioned pharmacologically active compounds.

The oxidation of compounds of formula IV can be effected with the aid of oxidizing agents usually employed for the manufacture of disulphide compounds, such as oxygen or hydrogen peroxide (preferably in the presence of heavy metal salts, such as copper-II salts or iron-III salts, for example halides or sulphates, as catalysts), halogens, especially iodine, hypohalites, such as alkali metal hypohalites, iron-III chloride, or heavy metal acylates, such as lead acylates, for example lead tetraacetate, usually in the presence of a suitable diluent, such as benzene, ethanol, acetone or acetic acid, and optionally in the presence of water.

Usually, the disulphide obtained is acylated in the crude state, for example according to the acylation process described above, such as by treatment with an acid or a derivative thereof, such as an acid halide, for example an acid chloride, optionally stepwise and/or in the presence of a suitable condensation agent or basic agent.

Possible reducing agents which are employed simultaneously during the treatment of a disulphide compound of formula VIII with ethylene oxide, are for example the above-mentioned chemical reducing agents, the reaction being carried out in a neutral or weakly acid medium. Zinc, which is used in the presence of aqueous acetic acid, is particularly suitable as a reducing agent.

In a compound of formula IX the primary hydroxyl group is converted in a manner which is in itself known, by acylation, into the acyloxy group of formula —O—C( = O)—$X_2$, especially into one of the groups of formulas —O—C( = O)—O—$R_o^a$, —O—C( = O)—O—$R_o^b$, —O—C( = O)—O—$R_o^c$, —O—C( = O)—O—$R_o^d$, —O—C( = O)—O—$R_o^e$ or —O—C(= O)—O—$R_o^f$, wherein $R_o^a$, $R_o^b$, $R_o^c$, $R_o^d$, $R_o^e$ and $R_o^f$ have the above-mentioned meanings, and primarily represent the 2,2,2-trichlorethyl, 2-bromethyl, 2-iodethyl, phenacyl, 4,5-dimethoxy-2-nitrobenzyl, 4 -methoxy-benzyl or tert.-butyl radical.

The above acylation reaction is for example carried out as described above.

In a compound of formula XI, a radical $R_2^A$ primarily represents one of the groups $R_o^a$, $R_o^b$, $R_o^c$, $R_o^d$, $R_o^e$, $R_o^f$ or $R_o^g$, such as one of the above-mentioned groups of this nature, and especially stands for the 2,2,2-trichlorethyl,2-iodethyl (or 2-bromethyl convertible thereto), phenacyl, 4,5-dimethoxy-2-nitro-benzyl, 4-methoxybenzyl or tert.-butyl radical.

The addition of the glyoxylic acid ester compound of formula XI to the nitrogen atom of the lactam ring of a compound of formula X preferably takes place at elevated temperature, primarily at about 50° C to about 150° C, and in particular in the absence of a condensation agent and/or without the formation of a salt. Here it is possible, instead of using the free glyoxylic acid ester compound, to use a reactive oxo derivative thereof, primarily a hydrate, and, when using the hydrate, water produced can, if necessary, be removed by distillation, for example azeotropically.

Preferably, the process is carried out in the presence of a suitable solvent, such as for example dioxane or toluene, or solvent mixture, if desired or necessary in a closed vessel under pressure and/or in the atmosphere of an inert gas, such as nitrogen.

In a compound of formula XII the secondary hydroxyl group can be converted in a manner which is in itself known into a reactive hydroxyl group esterified by a strong acid, especially into a halogen atom or into an organic sulphonyloxy group. In doing so, suitable halogenating agents are for example used, such as a thionyl halide, for example thionyl chloride, a phosphorus oxyhalide, especially phosphorus oxychloride, or a halogenophosphonium halide, such as triphenylphosphonium dibromide or diiodide, or a suitable organic sulphonic acid halide, such as sulphonic acid chloride, the reaction preferably being carried out in the presence of a basic agent, primarily an organic basic agent, such as an aliphatic tertiary amine, for example triethylamine or diisopropylethylamine, or of a heterocyclic base of the pyridine type, for example pyridine or collidine. Preferably, the process is carried out in the presence of a suitable solvent, for example dioxane or tetrahydrofurane, or of a solvent mixture, if necessary with cooling and/or in the atmosphere of an inert gas, such as nitrogen.

In a resulting compound of formula XIII, a reactive esterified hydroxyl group Z can be converted into another reactive esterified hydroxyl group in a manner which is in itself known. Thus it is for example possible to replace a chlorine atom by a bromine or iodine atom by treating the appropriate chlorine compound with a suitable bromine or iodine reagent, especially with an inorganic bromide or iodide salt, such as lithium bromide, preferably in the presence of a suitable solvent, such an ether.

In a phosphine compound of formula XIV, each of the groups $R_a$, $R_b$ and $R_c$ primarily denotes a lower alkyl radical which is optionally substituted, for example by etherified or esterified hydroxyl groups, such as lower alkoxy groups or halogen atoms, or a phenyl radical which is optionally substituted, for example by aliphatic hydrocarbon radicals, such as lower alkyl groups, or etherified or esterified hydroxyl groups, such as lower alkoxy groups or halogen atoms, or nitro groups.

The reaction of a compound of formula XIII with the phosphine compound of formula XIV, wherein each of the groups $R_a$, $R_b$ and $R_c$ primarily represents a phenyl radical, as well as a lower alkyl radical, especially the n-butyl radical, is preferably carried out in the presence of a suitable inert solvent, such as an aliphatic, cycloaliphatic or aromatic hydrocarbon, for example hexane, cyclohexane, benzene or toluene, or of an ether, for example dioxane, tetrahydrofurane or diethylene glycol-dimethyl ether, or of a solvent mixture. If necessary, the process is carried out with cooling, or at elevated temperature and/or in the atmosphere of an inert gas, such as nitrogen.

A phosphonium salt compound of formula XV$a$ formed as an intermediate usually spontaneously loses the elements of the acid of formula H—Z ( XV$b$ ); if necessary, the phosphonium salt compound can be decomposed by treatment with a weak base, such as an organic base, for example diisopropylethylamine or pyridine, and be converted into the phosphoranylidene compound of formula XV.

The splitting of the esterified carboxyl group of formula —C(= O)—$X_2$ in a compound of formula XV can be carried out in various ways, depending on the nature of the group $X_2$.

Thus it is possible to split a grouping of formula —C(= O)—$X_2$, wherein $X_2$ represents the group of formula —O—$R_o{}^a$ or —O—$R_o{}^b$, by treatment with a chemical reducing agent, a grouping of formula —C(= O)—$X_2$, wherein $X_2$ represents the group of formula —O—$R_o{}^c$ by irradiation, and a grouping of formula —C(= O)—$X_2$, wherein $X_2$ represents the group of formula —O—$R_o{}^d$ or $R_o{}^e$, by treatment with an acid. These reactions can for example be carried out as described above, and the process can also be carried out in the absence of water. An esterified carboxyl grouping of formula —C(= O)—O—$R_o{}^f$ can be split under weakly basic conditions, for example at a pH value of about 7 to about 9, for example by treatment with a weakly basic agent, such as an alkali metal hydrogen carbonate, such as sodium hydrogen carbonate, or a suitable buffer solution (pH about 7 to about 9), such as a dipotassium hydrogen phosphate buffer, preferably in the presence of water and of an organic solvent, such as methanol or acetone.

At the same time, the esterified carboxyl groups of formulas —C(= O)—$X_2$ and —C(= O)—O—$R_2{}^A$ in a compound of formula XV preferably differ from one another in such a way that under the conditions of splitting of the esterified carboxyl group of formula —C(= O)—$X_2$ the esterified carboxyl group of formula —C(= O)—O—$R_2{}^A$ remains intact. If, for example, the esterified carboxyl group of formula —C(= O)—$X_2$ represents an esterified carboxyl group which can be split on treatment with a chemical reducing agent, such as zinc in the presence of aqueous acetic acid, for example a grouping of formula —C(= O)—O—$R_o{}^a$ or —C(= O)—O—$R_o{}^b$, wherein $R_o{}^a$ preferably represents the 2,2,2-trichlorethyl radical or 2-iodethyl radical, or of the 2-bromethyl radical which can easily be converted into the latter, and $R_o{}^b$ primarily represents the phenacyl group, then the esterified carboxyl group of formula —C(= O)—O—$R_2{}^A$ for example represents one of the esterified carboxyl groups —C(= O)—O—$R_2{}^A$ which can be split on treatment with a suitable acid, such as trifluoracetic acid, for example represents a grouping of formula —C(= O)—O—$R_o{}^e$, wherein $R_o{}^e$ preferably represents the tert.-butyl group.

The oxidation of a primary carbinol group to a formyl group in a compound of formula XVI can surprisingly be effected by treatment with an oxidizing organic sulphoxide compound in the presence of agents having dehydrating or water-absorbing properties. Possible oxidizing sulphoxide compounds are primarily aliphatic sulphoxide compounds, such as di-lower alkylsulphoxides, primarily dimethylsulphoxide, or lower alkylenesulphoxides, for example tetramethylenesulphoxide. As agents with dehydrating or water-absorbing properties, acid anhydrides should primarily be mentioned, especially anhydrides of organic carboxylic acids, such as aliphatic or aromatic carboxylic acids, for example anhydrides of lower alkanecarboxylic acids, especially acetic anhydride, and also propionic anhydride, or benzoic anhydride, as well as anhydrides of inorganic acids, especially of phosphoric acids, such as phosphorus pentoxide. The above anhydrides, primarily of organic carboxylic acids, for example acetic anhydride, are preferably used in an approximately 1:1 mixture with the sulphoxide oxidizing agent. Further dehydrating or water-absorbing agents are carbodiimides, primarily dicyclohexylcarbodiimide, and also diisopropylcarbodiimide, or ketenimines, for example diphenyl-N-p-tolylketenimine; these reagents are preferably used in the presence of acid catalysts, such as phosphoric acid or pyridinium trifluoracetate or pyridinium phosphate. Sulphur trioxide can also be used as a dehydrating or water-absorbing agent, and is customarily employed in the form of a complex, for example with pyridine.

Usually, the sulphoxide oxidizing agent is used in excess. Sulphoxide compounds which are liquid under the reaction conditions, especially dimethylsulphoxide, can for example simultaneously serve as solvents; additionally, inert diluents, such as benzene, or mixtures of solvents can be used as solvents.

The above oxidation reaction is, if desired, carried out with cooling, but in most cases at room temperature or slightly elevated temperature.

In a compound of formula XVIII an acyl group Ac, especially an easily removable acyl group, can be removed in a manner which is in itself known, a tert.-butoxycarbonyl group for example by treatment with trifluoracetic acid, and a 2,2,2-trichlorethoxycarbonyl group by treatment with a suitable metal or a metal compound, for example zinc, or with a chromium-II compound, such as chromium-II chloride or acetate, advantageously in the presence of a hydrogen-releasing agent which together with the metal or the metal compound generates nascent hydrogen, preferably aqueous acetic acid. Furthermore it is possible,in a compound of formula XVIII, wherein a carboxyl group of formula $-C(=O)-O-R_2$ preferably represents a carboxyl group which has been protected, for example by esterification, including by silylation or stannylation, for example with a suitable organic halogeno-siliciom compound or halogen-tin-IV compound, such as trimethylchlorosilane, to split off a suitable acyl group Ac, wherein free functional groups which may be present are preferably protected, by treatment with an imide-halide-forming agent, such as a suitable inorganic acid halide, for example phosphorus pentachloride, preferably in the presence of a basic agent, such as pyridine, reaction of the resulting imide-halide with an alcohol, such as a lower alkanol, for example methanol, and splitting of the resulting imino-ether in an aqueous or alcoholic medium, preferably under acid conditions.

In a compound of formula XVIII thus obtained, the unsubstituted amino group can be acylated according to methods of acylation which are in themselves known, for example as described above, whereby an acyl group can also be introduced stepwise. Thus, it is possible to introduce a halogen-lower alkanoyl group, for example a bromacetyl group,into the free amino group of a compound of formula XVIII, and to react a N-halogen-lower alkanoylamino compound thus obtainable with suitable exchange reagents, such as basic compounds, for example tetrazole, thio compounds, for example 2-mercapto-1-methylimidazole, or metal salts, for example sodium azide; substituted N-lower-alkanoylamino compounds are thus obtained.

In a compound of formula XVIII having an esterified carboxyl group, the latter for example representing a carboxyl group of formula $-C(=O)-O-R_2^A$ which can easily be converted into the free carboxyl group, such esterified carboxyl group can be converted into the free carboxyl group in a manner which is in itself known, for example depending on the nature of the esterifying radical $R_2^A$, a grouping of formula $-C(=O)-O-R_o^a$ or $-C(=O)-O-R_o^b$ for example by treatment with a chemical reducing agent, such as a metal, for example zinc, or a reducing metal salt, such as a chromium-II salt, for example chromium-II chloride, usually in the presence of a hydrogen-releasing agent which together with the metal is capable of generating nascent hydrogen, such as an acid, primarily acetic acid, or an alcohol, water being preferably added, a grouping of formula $-C(=O)-O-R_o^c$ for example by irradiation, preferably with ultraviolet light, using ultraviolet light of shorter wavelengths, for example below 290 m$\mu$, if $R_o^c$ for example represents an arylmethyl radical which is optionally substituted in the 3-, 4- and/or 5-position, for example by lower alkoxy groups and/or nitro groups, or ultraviolet light of longer wavelengths, for example above 290 m$\mu$, if $R_o^c$ for example denotes an arylmethyl radical substituted in the 2-position by a nitro group, a grouping of formula $-C(=O)-O-R_o^d$ or $-C(=O)-O-R_o^e$ for example by treatment with an acid agent, such as formic acid or trifluoracetic acid, and a grouping of formula $-C(=O)-O-R_o^f$ hydrolytically, optionally under weakly acid or weakly basic conditions, for example by treatment with a weakly basic agent, such as aqueous sodium hydrogen carbonate, or an aqueous potassium phosphate buffer of pH about 7 to about 9.

In a compound of formula XVIII, a grouping of formula $-C(=O)-O-R_2^A$ can be converted into another grouping of this formula, for example a 2-bromethoxycarbonyl group $-C(O)-O-R_o^a$ can be converted into a 2-iodethoxycarbonyl group by treatment with an iodine salt, such as sodium iodide, in the presence of a suitable solvent, such as acetone.

A carboxyl group which is protected, for example by silylation, can be liberated in the customary manner, for example by treatment with water or with an alcohol.

In a compound of formula XVIII having a group of formula $-C(=O)-O-R_2$, wherein $R_2$ represents hydrogen, the free carboxyl group can be esterified in a manner which is in itself known, for example by treatment with a diazo compound, such as a diazo-lower alkane, for example diazomethane or diazoethane, or a phenyl-diazo-lower alkane, for example phenyldiazomethane or diphenyldiazomethane, or by reaction with an alcohol suitable for esterification, in the presence of an esterifying agent, such as a carbodiimide, for example dicyclohexylcarbodiimide, as well as carbonyldiimidazole, or according to any other known and suitable esterification process, such as reaction of a salt of the acid with a reactive ester of an alcohol and of a strong inorganic acid as well as of a strong organic sulphonic acid. It is furthermore possible to convert acid halides, such as acid chlorides (for example manufactured by treatment with oxalyl chloride), or activated esters, for example those with N-hydroxy-nitrogen compounds, or mixed anhydrides formed, for example, with halogenoformic acid lower alkyl esters, such as chloroformic acid ethyl ester, or with halogenacetic acid halides, such as trichloracetic acid chloride, into esters by reaction with alcohols, optionally in the presence of a base, such as pyridine.

Salts are especially those of compounds of formula XVIII, in which $R_2$ represents hydrogen, and primarily metal salts or ammonium salts, especially appropriate pharmaceutically usable, non-toxic salts, such as alkali metal salts and alkaline earth metal salts, for example sodium, potassium, magnesium or calcium salts, as well as ammonium salts with ammonia or suitable organic amines, it being possible primarily to use aliphatic, cycloaliphatic, cycloaliphatic-aliphatic and aliphatic primary, secondary or tertiary monoamines, diamines or polyamines for the salt formation, such as lower alkylamines, for example triethylamine, hydroxy-lower alkylamines, for example 2-hydroxyethylamine, bis-(2-hydroxyethyl)-amine or tri-(2-hydroxyethyl)-amine, basic aliphatic esters or carboxylic acids, for example 4-aminobenzoic acid 2-diethylaminoethyl ester, alkyleneamines, for example 1-ethylpiperidine, cycloalkylamines, for example bicyclohexylamine, or benzylamines, for example N,N'-dibenzylethylenediamine. Compounds of formula XVIII, in which for example, $R_1$ represents hydrogen, or which possess a basic group in an acyl radical $R_1$, can also form acid addition salts, especially pharmaceutically usable, non-toxic acid addition salts, for example with inorganic acids, such as hydrochloric acid, sulphuric acid or phosphoric acid, or with suitable organic carboxylic acids or sulphonic acids. Compounds of formula XVIII, wherein $R_2$ represents hydrogen, and in which $R_1$ represents hydrogen or which contain a basic group in an acyl radical $R_1$, can also be present in the form of an inner salt, that is to say in a zwitter-ion form.

Salts of compounds of formula XVIII can be manufactured in a manner which is in itself known. Thus, it is possible to form salts of compounds of formula XVIII, wherein $R_2$ represents hydrogen, for example by treatment with metal compounds, such as alkali metal salts of suitable carboxylic acids, for example the sodium salt of $\alpha$-ethyl-caproic acid, or with ammonia or a suitable organic amine, stoichiometric amounts, or only a slight excess, of the salt-forming agent being used preferably. Acid addition salts are obtained in the usual manner, for example by treatment with an acid or a suitable anion exchange reagent. Salts can be converted into the free compounds in the usual manner, metal salts and ammonium salts for example by treatment with suitable acids, and acid addition salts for example by treatment with a suitable basic agent.

The new compound of formula I can also be used as follows as a starting material for the manufacture of pharmacologically active compounds;

If the compound of formula I is reacted with a glyoxylic acid ester of formula XI or an aldehyde derivative, especially the hydrate thereof, preferably at elevated temperature and in the presence of an inert solvent, a compound of formula

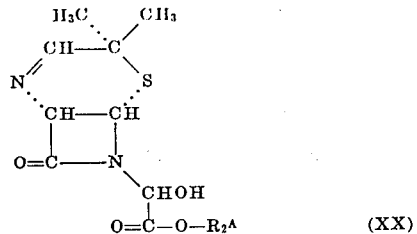

is obtained, in which the free hydroxyl group is converted into a reactive esterified hydroxyl group. A compound thus obtainable, of formula

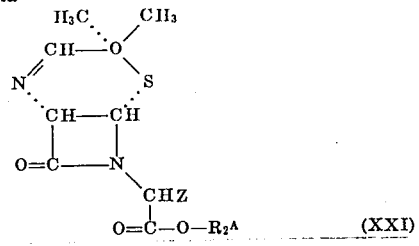

wherein Z represents a reactive esterified hydroxyl group, especially a halogen atom and primarily a chlorine atom as well as a bromine atom, is reacted with a phosphine compound of formula XIV, and the phosphoranylidene compound of formula

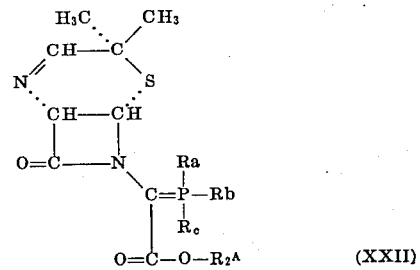

is obtained, which is left to stand in an aqueous medium, preferably at a pH value of about 5 to about 8, and is thereby converted into a ceph-3-em compound of formula

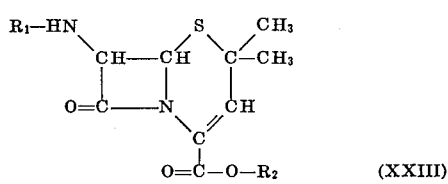

wherein $R_1$ represents hydrogen and $R_2$ represents the organic radical $R_2^A$. In such a compound, it is possible, in a manner which is in itself known, either first to convert the free amino group into an acylamino group, in which acyl represents the acyl radical Ac of an organic carboxylic acid, primarily an acyl radical occurring in a pharmacologically active N-acyl derivative of 6-amino-penicillanic acid or 7-amino-cephalosporanic acid, or an acyl radical which can easily be split off, especially under acid conditions, of a carbonic acid half-derivative, and then to liberate the carboxyl group, or first to convert the esterified carboxyl group into the free carboxyl group and then to acylate the free amino group.

Compounds of formula XXIII, especially those in which $R_1$ represents an acyl radical of an organic carboxylic acid occurring in pharmacologically active N-acyl derivatives of 6-amino-penicillanic acid compounds and 7-amino-cephalosporanic acid compounds, and $R_2$ represents hydrogen or an organic radical which together with the carboxyl grouping forms an esterified carboxyl group which can be split physiologically, are, similarly to the corresponding compounds of formula XVIII, active against micro-organisms, such as gram-positive bacteria, for example *Staphylococcus aureus*, and especially also against penicillin-resistant bacteria of this type, for example in dilutions of down to 0.0001 γ/ml, and against gram-negative bacteria, for example *Escherichia coli*. Other compounds of formula XXIII, for example those in which $R_1$ represents hydrogen and/or $R_2$ represents an organic radical which is easily replaceable by hydrogen, can, for example similarly to the corresponding compounds of formula XVIII, and as indicated above, be used as intermediate products for the manufacture of the above pharmacologically active compounds.

Ceph-3-em compounds of formula XXIII can also be obtained if a phosphoranylidene compound of formula XXII is N-acylated with a suitable acylating agent, such as a carboxylic acid halide, for example chloride, which yields the radical Ac, in the absence of a basic agent; after treating the resulting intermediate product with water, a ceph-3-em compound of formula XXIII is thus obtained, wherein $R_1$ represents an acyl radical Ac and $R_2$ represents the organic radical $R_2^A$, and in which the free carboxyl group can be liberated from the esterified carboxyl group and, in a manner which is in itself known, functional groups which may be present in the acyl radical Ac can be liberated from protected functional groups, and/or the acyl radical Ac can be split off and the free amino group can be acylated.

The condensation of the compound of formula I with the glyoxylic acid ester of formula XI, the conversion of the secondary hydroxyl group in a compound of formula XX into a reactive esterified hydroxyl group Z, primarily into a halogen atom, and the reaction of a compound of formula XXI, wherein the group Z represents a reactive esterified hydroxyl group, with a phosphine compound of formula XIV, wherein each of the groups $R_a$, $R_b$ and $R_c$ primarily represent an optionally substituted lower alkyl radical or phenyl radical, for example n-butyl radical or phenyl radical, are carried out according to the processes described above.

The conversion of a phosphoranylidene compound of formula XXII into a compound of formula XXIII, which takes place at a pH value of about 5 to about 8, is preferably carried out in a suitable buffer solution, for example in an aqueous di-alkali metal hydrogen phosphate/tri-alkali metal phosphate buffer solution, such an aqueous, for example 0.05 to 0.5 molar, dipotassium hydrogen phosphate/tripotassium phosphate buffer solution, preferably at room temperature or with cooling.

If a compound of formula XXIII it is possible, if desired, to acylate the amino group, for example according to the acylating process described above, and to convert an esterified carboxyl group which can easily be converted into the free carboxyl group, depending on the nature of the alcohol radical, into the free carboxyl group, for example according to the ester splitting process described above.

An acylating agent which can be used for the direct conversion of a phosphoranylidene compound of formula XXII into a compound of formula XXIII, wherein $R_1$ represents an acyl radical and $R_2$ represents an organic radical $R_2^A$, is primarily a halide, especially the chloride, of an organic carboxylic acid of formula Ac—OH (XXIV), and also an appropriate, optionally mixed, anhydride. Here the acylation reaction is carried out in the absence of a basic agent which is otherwise customary, preferably in the presence of an inert solvent, such as dioxane. The N-acylated intermediate product is treated, usually without isolation, with at least 1 mol of water, but with not too great an excess of water, the mixture being warmed for a short period, if necessary. After removal of the water, for example by treatment with an anhydrous drying agent, such as sodium sulphate, the reaction mixture is warmed, for example at about 50° C to about 100° C, in order to ensure the complete formation of the compound of formula XXIII. In the latter it is possible, if desired, to liberate the esterified carboxyl group and protect the functional groups which may be present in the acyl radical Ac, for example according to the processes described above, and also to replace an acyl group Ac by hydrogen and to acylate a free amino group.

The abovementioned acyl groups Ac, as also Ac$_a$, primarily represent the acyl radials of organic carboxylic acids which occur in pharmacologically active N-acyl derivatives of 6-aminopenam-3-carboxylic acid compounds or 7-amino-ceph-3-em-4-carboxylic acid compounds, such as for example the above-mentioned acyl radicals, and also acyl radicals which can easily be split off, such as for example acyl radical of carbonic acid half-esters which can be split off on treatment with a chemical reducing agent, such as zinc in the presence of aqueous acetic acid, or by treatment with acid, for example with trifluoracetic acid, such as for example the tert.-butoxycarbonyl, tert.-pentoxycarbonyl, 2,2,2-trichlorethoxycarbonyl or 2-iodethoxycarbonyl radical or a radical which can be converted into the latter, such as the 2-bromethoxycarbonyl radical, as well as the phenacyloxycarbonyl, adamantyloxycarbonyl, diphenylmethoxycarbonyl, α-4-biphenylyl-α-methylethoxycarbonyl or furfuryloxycarbonyl radical.

The compounds of formulas XVIII and XXIII having pharmacological effects can for example be used in the form of pharmaceutical preparations in which they are present mixed with a solid or liquid pharmaceutical excipient, and which are suitable for enteral, parenteral or topical administration. Suitable carriers which are inert towards the active substances are, for example, water, gelatine, saccharides, such as lactose, glucose or sucrose, starches, such as corn starch, wheat starch or arrowroot, stearic acid or slats thereof, such as magnesium stearate or calcium stearate, talc, vegetable fats and oils, alginic acid, benzyl alcohols, glycols or other known excipients. The preparations can be in a solid form, for example as tablets, dragees, capsules or suppositories, or in a liquid form, for example as solutions, suspensions or emulsions. They can be sterilized and/or contain auxiliary substances, such as preservatives, stabilizers, wetting agents or emulsifiers, solubilizing agents, salts for regulating the osmotic pressure and/or buffers. Furthermore they can contain other pharmacologically usable substances. The pharmaceutical preparations which are also encompassed by the present invention, can be formulated in a manner which is in itself known.

The invention is described in the examples which follow.

EXAMPLE 1

A solution of 5 g of 6-amino-2,2-dimethyl-3-(N-2,2,2-trichlorethoxycarbonyl-amino)-penam in 100 ml of dimethylformamide is added to 65 ml of a 1,7-molar aqueous chromium-II-chloride solution, the latter being kept at 0° C and the process being carried out under a nitrogen atmosphere. When the exothermic reaction has subsided, the reaction mixture is stirred for 30 minutes under a nitrogen atmosphere at 22° C and is subsequently brought to a pH value of 7.5 by addition of 50 percent strength aqueous tripotassium phosphate solution. The mixture is evaporated under a pressure of 0.1 mm Hg and the residue is digested with methylene chloride. The insoluble residue is separated off and the solution is dried over sodium sulphate and evaporated under reduced pressure. The residue is crystallized from a mixture of tetrahydrofurane and diethyl ether and yields 4,4-dimethyl-5-thia-2,7-diaza-bicyclo [4.2.0] oct-2-en8-one of formula

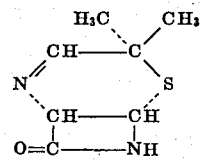

which melts at 152°–153° C; thin layer chromatogram (silica gel): Rf = 0.09 (system: toluene/acetone 8:2) and Rf = 0.25 (system: toluene/acetone 6:4); infra-red absorption spectrum (in methylene chloride): characteristic bands at 3.01μ, 3.49μ, 5.63μ, 6.07μ, 7.33μ, 7.48μ, 8.52μ, 9.27μ and 10.39μ.

The starting material can be manufactured as follows:

A suspension of 30 g of the potassium salt of 2,2-dimethyl-6-(N-phenylacetylamino)-penam-3-carboxylic acid in a mixture of 150 ml of anhydrous dimethylformamide and 12 ml of pyridine is treated with 9 ml of trichloracetyl chloride at −15° C under a nitrogen atmosphere, and the whole is stirred for 15 minutes at −15° C. The clear yellow solution is treated with 6.5 g of solid sodium azide and again stirred for 15 minutes at −15°C, and is thereafter poured out, while stirring, onto a mixture of 400 ml of toluene and 400 ml of ice water. The phases are separated; the aqueous solution is twice extracted cold with 250 ml portions of toluene. The three organic solutions are twice washed with 250 ml portions of ice water, combined, dried over sodium sulphate and evaporated under reduced pressure. The residue contains 2,2-dimethyl-6-(N-phenylacetyl-amino)-penam-3-carboxylic acid azide; infrared absorption spectrum (in methylene chloride): characteristic bands at 3.02μ, 4.69μ, 5.60μ, 5.93μ, 6.70μ and 8.54μ; thin layer chromatogram (silica gel): Rf = 0.49 (system toluene/acetone, 8:2) and Rf = 0.69 (system: toluene/acetone, 6:4); this material still contains solvent and on further drying changes into 3-isocyanato-2,2-dimethyl-6-(N-phenylacetyl-amino)-penam.

24.3 g of the 2,2-dimethyl-6-(N-phenylacetyl-amino)-penam-3-carboxylic acid azide obtained as the evaporation residue are dried for 24 hours at 20° C under a high vacuum. 3-Isocyanato-2,2-dimethyl-6-(N-phenylacetyl-amino)-penam is obtained as a light brown foam; infrared spectrum (in methylene chloride): characteristic bands at 3.00μ, 4.44μ, 5.59μ, 5.93μ, 6.69μ, 7.98μ and 8.35μ; thin layer chromatogram (silica gel): Rf = 0.23 (system toluene/acteone, 8:2), and Rf = 0.52 (system toluene/acetone, 6:4). 3-Isocyanato-2,2-dimethyl-6-(N-phenylacetyl-amino)-penam is also obtained if a benzene solution of 2,2-dimethyl-6-(N-phenylacetyl-amino)-penam-3-carboxylic acid azide is heated for half an hour to 70° C under a nitrogen atmosphere.

A solution of 19.3 g of 3-isocyanato-2,2-dimethyl-6-(N-phenylacetyl-amino)-penam in 200 ml of benzene is treated with 14.1 ml of 2,2,2-trichlorethanol and the exothermic reaction is started by adding 0.9 ml of triethylamine; at the same time the temperature is kept at 20° C by cooling. The mixture is left to stand for 1 hour at 20° C and 1 hour at 0° C, and the precipitate is filtered off and washed with 50 ml of a cold 1:1 mixture of benzene and hexane and with hexane (room temperature). The 2,2-dimethyl-6-(N-phenylacetyl-amino)-3-(N-2,2,2-trichlorethoxycarbonyl-amino)-penam thus obtained melts at 200°–202° C (corrected); thin layer chromatogram (silica gel), Rf = 0.35 (system toluene/acetone, 8:2), and Rf = 0.66 (system toluene/acetone, 6:4).

A solution of 11.0 g of 2,2-dimethyl-6-(N-phenylacetylamino)-3-(N-2,2,2-trichlorethoxycarbonyl-amino)-penam in a mixture of 240 ml of anhydrous methylene chloride and 25.6 ml of pyridine is treated with 166 ml of a 10 percent strength solution of phosphorus pentachtoride in methylene chloride at −10° C under a nitrogen atmosphere and the whole is subsequently stirred for 30 minutes at 0° C. 120 ml of absolute methanol are then added with intense cooling (−10° C) and the mixture is stirred for a further 2 hours. 80 ml of water are added, the pH value (measured in samples diluted with water) is adjusted to 3.3 with about 9 ml of a 2 N aqueous sodium hydroxide solution, and the mixture is allowed to react for 1 hour at 0° C and for a further hour at 20° C. It is then poured, with stirring, onto 500 ml of a 1 M aqueous dipotassium hydrogen phosphate buffer solution and the pH value is adjusted from 6.5 to 7.0 by adding 50 percent strength aqueous tripotassium phosphate solution. The aqueous phase is separated off and twice washed with 200 ml portions of methylene chloride; the three organic solutions are each twice washed with water, combined, dried over sodium sulphate and evaporated under reduced pressure. The crystalline residue is taken up in 40 ml of a 1:1 mixture of benzene and hexane; the mixture is cooled for 15 minutes at 0° C and the precipitate is filtered off. 6-Amino-2,2-dimethyl-3-(N-2,2,2-trichlorethoxycarbonyl-amino)-penam is thus obtained, melting at 179°–180° C (corrected); infrared absorption spectrum: characteristic bands (in methylene chloride) at 2.90μ, 5.58μ, 6.62μ, 7.17μ, 7.27μ, 8.32μ, 8.46μ, 8.82μ, 9.25μ and 9.62μ; (in Nujol) at 2.95μ, 3.01μ, 3.11μ, 5.64μ, 5.80μ, 6.35μ, 7.60μ, 7.87μ, 8.00μ, 8.27μ, 8.65μ, 8.70μ, 9.16μ and 9.57μ; thin layer chromatogram (silica gel): Rf =0.17 (in the system toluene/acetone, 8:2) and Rf = 0.43 (in the system toluene/acetone, 6:4); characteristic yellow color with ninhydrin-collidine (free amino group).

Example 2

A mixture of 0.005 g of 6-amino-3-(N-4-methoxybenzyloxycarbonyl-amino)-2,2-dimethyl-penam and 1 ml of trifluoracetic acid is left to stand for 5 minutes at room temperature and is then evaporated at 0.1 mm Hg. The residue is taken up in a mixture of pyridine and toluene and again evaporated. The residue contains 4,4-dimethyl-5-thia-2,7-diazabicyclo[4.2.0]oct-2-en-8-one, which in a thin layer chromatorgram (silica gel) shows an Rf value of 0.08 (system: toluene/acetone, 8:2) and of 0.22 (system: toluene/acetone, 6:4); melting point 152°–153° C (corrected), after crystallization from a mixture of tetrahydrofurane and diethyl ether.

If instead of 1 ml of trifluoroacetic acid 1 ml of formic acid is used and the mixture is left to stand for 30 minutes, 4,4-dimethyl-5-thia-2,7-diaza[4.2.0]oct-2-en-8-one is again obtained.

The starting material can be obtained as follows:

A solution of 4.61 g of crude 3-isocyanato-2,2-di-methyl-6-(N-phenylacetyl-amino)-penam in 50 ml of benzene is treated with 3.73 g of 4-methoxybenzyl alcohol and 0.2 ml of triethylamine and left to stand for 3 hours, and is then evaporated under reduced pressure. The residue is chromatographed on 250 g of silica gel; the fractions eluted with a 9:1 mixture of toluene and acetone contain the amorphous 3-(N-4-methoxybenzyloxycarbonyl-amino)-2,2-dimethyl-6-(N-phenylacetyl-amino)-penum, which in a thin layer chromatogram (silica gel) in the system toluene/acetone (8:2) shows an Rf value of 0.27, and in the system toluene/acetone (6:4) shows an Rf value of 0.59; infrared absorption spectrum (in methylene chloride): characteristic bands at 2.88μ, 5.56μ, 5.76μ, 5.91μ, 6.16μ, 6.64μ, 8.48μ and 9.67μ.

A solution of 3.0 g of 3-(N-4-methoxybenzyloxycarbonylamino)-2,2-dimethyl-6-(N-phenylacetyl-amino)-penam in a mixture of 65 ml of anhydrous methylene chloride and 7.1 ml of pyridine is treated under a nitrogen atmosphere, at −10° C, with 46 ml of a 10 percent strength solution of phosphorus pentachloride in methylene chloride, and subsequently the whole is stirred for 30 minutes at 0° C. 33 ml of absolute methanol are added thereto with intense cooling (−10° C), and the mixture is stirred for a further 2 hours. 22 ml of water are added, the pH value (measured in samples diluted with water) is adjusted to 3.3 with about 2 ml of a 2 N aqueous sodium hydroxide solution, and reaction is allowed to take place for half an hour at 0° C and for 1 hour at 20° C. The mixture is then poured out onto 140 ml of a 1 M aqueous dipotassium hydrogen phosphate buffer solution, whilst stirring, and the pH value is adjusted to 7.0 by adding 10.7 ml of a 50 percent strength aqueous tripotassium phosphate solution. The aqueous phase is separated off and washed three times with 140 ml portions of methylene chloride; the four organic solutions are each twice washed with 200 ml of water, combined, dried over sodium sulphate and evaporated under reduced pressure. The amorphous residue is digested with hexane; the hexane-insoluble component contains 6-amino-3-(N-4-methoxybenzyloxycarbonylamino)-2,2-dimethyl-penam, which in a thin layer chromatogram in the system toluene/acetone (8:2) shows an Rf value of 0.13 and in the system toluene/acetone (6:4) shows an Rf value of 0.32; infrared absorption spectrum (in methylene chloride); characteristic bands at 3.00μ, 5.62μ, 5.81μ, 6.21μ, 6.70μ, 8.54μ and 9.65μ.

EXAMPLE 3

A solution of 0.26 g. of 6-amino-3-(N-2-iodethoxycarbonyl-amino)-2,2-dimethyl-penam in 5 ml of tetrahydrofurane is diluted with 15 ml of 90 percent strength aqueous acetic acid, and the mixture is cooled to 0° C and treated with 2 g of zinc dust while stirring vigorously. The reaction mixture is stirred for a further 10 minutes at 0° C and is then filtered through a filter with a layer of a diatomaceous earth preparation. The filter residue is suspended in tetrahydrofurane, again filtered and well rinsed with methylene chloride. The combined filtrates are evaporated under reduced pressure and at low temperature, and to remove the acetic acid the residue is repeatedly evaporated to dryness with toluene under a high vacuum, and is then taken up in 80 ml of methylene chloride and 30 ml of a saturated aqueous sodium chloride solution and well shaken. The organic phase is separated off and washed with 40 ml of an 0.5 molar dipotassium hydrogen phosphate solution saturated with sodium chloride, and with 30 ml of a saturated aqueous sodium chloride solution. The aqueous solutions are further washed twice with 70 ml portions of methylene chloride; the combined organic solutions are dried over magnesium sulphate and evaporated under reduced pressure. 0.085 g of the residue, in methylene chloride, is chromatographed on 5 g of silica gel (containing 7 percent of water; column). 3 -Isopropyl-4-thia-2,6-diazabicyclo[3.2.0]heptan-7-one, melting point 151°–155° C after recrystallization from a mixture of methylene chloride and hexane, is eluted with methylene chloride containing from about 10 percent to about 20 percent of acetic acid methyl ester. The 4,4-dimethyl-5-thia-2,7-diazacyclo[4.2.0]doct-2-en-8-one which is also formed, melting point 152°–153° C after crystallization from a mixture of tetrahydrofuran and diethyl ether, is eluted with methylene chloride containing about 50 percent of acetic acid methyl ester.

The starting material can be manufactured as follows:

The yellow solution of 23 g of crude 3-isocyanato-2,2-dimethyl-6-(N-phenylacetyl-amino)-penam, produced by warming 2,2-dimethyl-6-(N-phenylacetyl-amino)-penam-3-carboxylic acid azide, in 230 ml of benzene is treated with 4.9 ml of 2-bromethanol and 0.1 ml of bis-tri-n-butyl-tin oxide, and left to stand for 2 hours at room temperature and then evaporated. The residue is taken up in methylene chloride and chromatographed on 350 g of silica gel (column). The 3-(N-2-bromethyloxycarbonyl-amino)-2,2-dimethyl-6-(N-phenylacetyl-amino)-penam is eluted with a 9:1 mixture of methylene chloride and acetic acid ethyl ester. After recrystallization from a mixture of methylene chloride and cyclohexane, or acetone and cyclohexane, the product melts at 149°–150° C; $[\alpha]_D^{20} = +99° ± 1°$ ($c = 1.008$ in chloroform); thin layer chromatogram (silica gel): Rf = 0.51 (system toluene/acetic acid ethyl ester, 1:1), Rf = 0.32 (system toluene/acetone, 4:1) and Rf = 0.71 (system toluene/acetone, 1:1); ultraviolet absorption spectrum (in ethanol): $\lambda_{max}$ 252 mμ ($\epsilon$ = 300), 258 mμ ($\epsilon$ = 270) and 265 nμ ($\epsilon$ = 180); infrared absorption spectrum: characteristic bands at 2.91μ, 5.58μ, 5.77μ, 5.94μ, 6.62μ (shoulder), 6.66μ, 8.21μ, 8.30μ, 8.48μ, 9.32 μ and 9.64μ (in methylene chloride), and at 2.93μ, 2.95μ, 3.01μ, 5.62μ, 5.79μ, 5.82μ (shoulder), 5.91μ, 5.98μ, 6.53μ, 6.57μ, 6.68μ and 7.36μ (in mineral oil).

A solution of 6.9 g of sodium iodide in 34.5 ml of purified acetone is poured over 5.265 g of 3-(N-2-bromethyloxycarbonyl-amino)-2,2-dimethyl-6-(N-phenylacetyl-amino)-penam and the whole is allowed to stand for 16 hours at 30° C; a dense precipitate of sodium bromide begins to separate out already after a few minutes. After completion of the reaction, the solvent is evaporated off under reduced pressure and the residue is taken up in 30 ml of water and 70 ml of acetic acid ethyl ester. The golden yellow organic phase is shaken after adding a few drops of 0.1 N aqueous sodium thiosulphate solution; the aqueous phase is separated off and twice washed with 50 ml portions of acetic acid ethyl ester. The combined organic solutions are twice washed with 20 ml portions of water, dried over magnesium sulphate and concentrated to a volume of 20–30 ml. They are diluted with 50 ml of methylene chloride, treated with 200 ml of hot cyclohexane, cooled to room temperature and left to stand for 1 hour at 4° C. The colorless needles are filtered off and washed with a 4:1 mixture of cyclohexane and ether. 3-(N-2-Iodethoxycarbonylamino)-2,2-dimethyl-6-(N-phenylacetyl-amino)-penam is obtained, which after crystallization from acetic acid methyl ester and cyclohexane melts at 153°–154° C; $[\alpha]_D^{20} = +89° \pm 1°$ ($c = 1.011$ in chloroform); thin layer chromatogram (silica gel): Rf = 0.56 (system toluene/acetic acid ethyl ester, 1:1), Rf = 0.35 (system toluene/acetone, 4:1) and Rf = 0.74 (system toluene/acetone, 1:1); ultraviolet absorption spectrum (in ethanol): $\lambda_{max}$ 252 m$\mu$ ($\epsilon = 815$), 258 m$\mu$ ($\epsilon = 775$), 264 m$\mu$ ($\epsilon = 600$) and 335 M$\mu$ ($\epsilon = 45$); infrared absorption spectrum: characteristic bands at 2.90$\mu$, 5.58$\mu$, 5.76$\mu$, 5.93$\mu$, 6.65$\mu$, 6.85$\mu$, 8.18$\mu$, 8.34$\mu$, 8.47$\mu$ AND 9.37$\mu$ (in methylene chloride) and at 2.97$\mu$ (shoulder), 3.03$\mu$, 5.62$\mu$, 5.87$\mu$, 6.58$\mu$, 6.59$\mu$, 6.67$\mu$, 7.65$\mu$, 8.01$\mu$, 9.67$\mu$ and 13.92$\mu$ (in mineral oil).

A solution of 5.03 g of 3-(N-2-iodethoxycarbonylamino)-2,2-dimethyl-6-(N-phenylacetyl-amino)-penam in 105 ml of absolute methylene chloride and 11 ml of absolute pyridine is cooled to about −10° C under a nitrogen atmosphere and treated with 91 ml of an 8 percent strength solution of phosphorus pentachloride in absolute methylene chloride. The reaction mixture is stirred for 30 minutes at 0° C, then again cooled to −10° C and treated with 50 ml of absolute ethanol. After 105 minutes at 0° C, the reaction mixture is diluted with 36 ml of water, the pH value of the two-phase solution is adjusted from 2.1 to 3.3 by adding about 12 ml of a 2 N aqueous sodium hydroxide solution, and the mixture is further stirred for 30 minutes at 0° C and then for 45 minutes at room temperature. The reaction mixture is poured out onto 120 ml of a 1 molar aqueous dipotassium phosphate solution and the pH value is adjusted to 7.0 by adding 50 percent strength aqueous tripotassium phosphate solution. The organic phase is separated off and twice washed with 40 ml portions of a saturated aqueous sodium chloride solution. The aqueous solutions are twice back-extracted with 100 ml portions of methylene chloride, and the combined organic solutions are dried over anhydrous magnesium sulphate and evaporated under reduced pressure and mild conditions (low temperature), and the residue is briefly dried under reduced pressure.

The amorphous, honey-colored residue, in methylene chloride, is chromatographed on 100 g of silica gel (column), non-polar by-products being eluted with methylene chloride and with methylene chloride containing 3 percent of acetic acid methyl ester. 6-Amino-3-(N-2-iodethoxycarbonylamino)-2,2-dimethyl-penam is eluted with methylene chloride containing 5–20 percent of acetic acid methyl ester, and after repeated chromatography melts at 131°–134° C; $[\alpha]_D^{20} = +86° \pm 1°$ ($c = 0.974$ in chloroform); thin layer chromatography: Rf = 0.18 (system, 1:1 mixture of toluene:acetic acid ethyl ester), Rf = 0.30 (system, 4:1 mixture of chloroform:acetone) and Rf = 0.58 (system, 1:1 mixture of toluene:acetone), infrared absorption spectrum: characteristic bands in methylene chloride at 2.90$\mu$, 5.60$\mu$, 5.77$\mu$, 6.18$\mu$, 6.64$\mu$, 6.85$\mu$, 8.17$\mu$, 8.34$\mu$, 8.47$\mu$, 9.25$\mu$, 9.37$\mu$, and 9.66$\mu$, and in mineral oil at 2.98$\mu$, 5.71$\mu$, 5.79$\mu$, 6.50$\mu$, 7.61$\mu$, 8.04$\mu$, 8.39$\mu$, 9.18$\mu$, 9.72$\mu$, 10.65$\mu$ and 11.54$\mu$.

The 4,4-dimethyl-5-thia-2,7-diazacyclo[4.2.0]doct-2-en-8 one obtainable according to the invention can for example be further used as follows.

Example 4

0.051 g of 4,4-dimethyl-5-thia-2,7-diazabicyclo[4.2.0]oct-2-en-8-one and 0.1 g of zinc dust are taken up in a mixture of 0.5 ml of water, 1 ml of acetone and 0.2 ml of glacial acetic acid and the whole is shaken for 1 hour at 22° C. After filtering, the solution is distributed between 20 ml of acetic acid ethyl ester and 10 ml of 1 M aqueous dipotassium hydrogen phosphate solution; the aqueous phase is extracted with 20 ml of acetic acid ethyl ester. The combined organic solutions are washed with 10 ml of 1 M aqueous dipotassium hydrogen phosphate solution, dried over sodium sulphate and evaporated; 3-isopropyl-4-thia-2,6-diazabicyclo[3.2.0]heptan-7-one is thus obtained, which according to a thin layer chromatogram (silica gel; systems, toluene/acetone, 6:4 and 8:2) is a uniform substance, and after recrystallization from a mixture of methylene chloride and hexane melts at 151°–155° C; infra-red absorption spectrum (in methylene chloride): characteristic bands at 2.98$\mu$, 3.32$\mu$, 3.40$\mu$, 5.65$\mu$, 7.07$\mu$, 8.90$\mu$, 10.51$\mu$ and 11.17$\mu$.

A solution of 1.64 g of 3-isopropyl-4-thia-2,6-diazabicyclo[3.2.0]heptan-7-one in 33 ml of a 1:1 mixture of acetic acid and water is treated, over the course of 10 minutes, with 71.7 ml of an 0.5 N solution of iodine in ethanol, and the whole is left to stand for 1 hour at room temperature and then concentrated under reduced pressure. The residue is dried in a high vacuum, suspended in 90 ml of acetonitrile, and treated with 4.5 ml of pyridine and 4.5 ml of phenylacetic acid chloride at 0° C. The mixture is left to stand for 15 minutes at 0° C and for 1 hour at room temperature, and is then evaporated under reduced pressure. The product is triturated for 30 minutes with 10 ml of a 1:1 mixture of dioxane and water, and the residue is taken up in acetic acid ethyl ester; the solution is washed with a saturated aqueous sodium hydrogen carbonate solution and a saturated aqueous sodium chloride solution, dried and evaporated. The oily residue is chromatographed on 100 g of pure silica gel; the oily bis-[2-oxo-3$\beta$-(N-phenylacetyl-amino)-azetidin-4$\beta$-yl]-disulphide is eluted with a 19:1 mixture of acetic acid ethyl ester and acetone and is converted into a finely pulverulent, amorphous form by lyophilization; thin layer chromatogram (silica gel): Rf≈0.36 (system: acetic acid ethyl ester/acetone, 1:1); infrared absorption spectrum (in potassium bromide): characteristic bands at 3.08$\mu$, 5.62$\mu$, 5.97$\mu$ and 6.51$\mu$.

A solution of 0.35 g of bis-[2-oxo-3$\beta$-(N-phenylacetyl-amino)-4$\beta$-azetidinyl]-disulphide in 16 ml of a 9:1 mixture of acetic acid and water is treated, at about 5° C, with about 3.2 g of ethylene oxide and then with 3.5 g of zinc dust. The reaction mixture is stirred for 15 minutes at about 5° C and for 30 minutes at room temperature, and is then filtered. The filter residue is rinsed with acetone and the filtrate is evaporated. The residue is taken up in about 150 ml of acetic acid ethyl ester and the solution is washed with 50 ml of a saturated aqueous sodium hydrogen carbonate solution and with 100 ml of a saturated aqueous sodium chloride solution, dried and evaporated. The residue, together with a crude product obtained analogously from 0.58 g of bis-[2-oxo-3$\beta$-(N-phenylacetyl-amino)-4$\beta$-azetidinyl]-disulphide, is chromatographed on 50 g of silica gel. Elution with a 19:1 mixture of ethyl acetate and acetone yields 4$\beta$-(2-hydroxyethylmercapto)-3$\beta$-(N-phenylacetyl-amino)-azetidin-2-one as a single product, which after crystallization from a mixture of acetone and diethyl ether melts at 141°–142° C; $[\alpha]_D^{20} = +44° \pm 2°$ ($c = 0.571$ in ethanol); thin layer chromatography (silica gel; development with iodine): Rf 0.45 (system: acetic acid ethyl ester/acetone, 1:1); infrared absorption spectrum (in mineral oil): characteristic bands at 3.01$\mu$, 5.68$\mu$, 6.01$\mu$, 6.43$\mu$ and 6.52$\mu$.

A solution of 0.61 g of 4$\beta$-(2-hydroxyethylmercapto)-3$\beta$-(N-phenylacetyl-amino)-azetidin-2-one in 10 ml of tetrahydrofurane is treated dropwise, at 0° C, with 1.38 g of chloroformic acid 2,2,2-trichlorethyl ester in 5 ml of tetrahydrofurane, and then with 1.06 g of pyridine in 5 ml of tetrahydrofurane. The reaction mixture is stirred for 15 minutes at 0° C and for 2 hours at room temperature, under a nitrogen atmosphere, and is then taken up in 150 ml of methylene chloride. The solution is washed with a saturated aqueous sodium chloride solution, dried and evaporated. The residue is chromatographed on a 50-fold quantity of silica gel; 3$\beta$-(N-phenylacetyl-amino)-4$\beta$-[2-(2,2,2-trichlorethoxycarbonyloxy)-ethylmercapto]-azetidin-2-one is eluted with a 1:1 mixture of methylene chloride and acetic acid ethyl ester. After crystallization and a single recrystallization from diethyl ether, the product is obtained in the form of colorless needles, melting point 99°–101° C; thin layer chromatogram (silica gel): Rf≈0.46 (system: acetic acid ethyl ester; development with iodine); $[\alpha]_D^{20} = +3° \pm 2°$ ($c = 0.518$ in chloroform); infrared absorption spectrum (in methylene chloride): characteristic bands at 2.88µ, 5.58µ, 5.64µ, 5.92µ and 6.62µ.

A mixture of 1.0 g of 3β-(N-phenylacetyl-amino)-4β-[2-(2,2,2-trichlorethoxycarbonyloxy)-ethylmercapto]-azetidin-2-one and 3.0 g of glyoxylic acid tert.-butyl ester hydrate in 50 ml of benzene is boiled for 16 hours under reflux, with water being separated off, and is then cooled, twice washed with 25 ml portions of distilled water, dried over sodium sulphate and evaporated. α-Hydroxy-α-{2-oxo-3β-(N-phenyl-acetyl-amino)-4β-[2-(2,2,2-trichlorethoxycarbonyloxy)-ethylmercapto]-1-azetidinyl}-acetic acid tert.-butyl ester is thus obtained, and this is used further without purification.

The crude α-hydroxy-α-{2-oxo-3β-(N-phenylacetyl-amino)-4β-[2-(2,2,2-trichlorethoxycarbonyloxy)-ethylmercapto]-1-azetidinyl}-acetic acid tert.-butyl ester obtainable according to the above process is dissolved in 20 ml of a 1:1 mixture of dioxane and tetrahydrofurane and treated dropwise, at −10° C, with 0.54 ml of pyridine in 2 ml of dioxane and 0.48 ml of thionyl chloride in 10 ml of a 1:1 mixture of dioxane and tetrahydrofurane. The reaction mixture is stirred for 30 minutes at −10° to −5° C and for 1 hour under a nitrogen atmosphere, the precipitate is filtered off and the filtrate containing the α-chlor-α-{2-oxo-3β-(N-phenylacetyl-amino)-4β-[2-(2,2,2-trichlorethoxycarbonyloxy)-ethylmercapto]-1-azetidinyl}-acetic acid tert.-butyl ester is evaporated; the product is further used in the crude state.

A solution of the crude α-chlor-α-{2-oxo-3β-(N-phenyl-acetyl-amino)-4β-[2-(2,2,2-trichlorethoxycarbonyloxy)-ethylmercapto]-1-azetidinyl}-acetic acid tert.-butyl ester obtainable according to the above process, in 30 ml of a 1:1 mixture of dioxane and tetrahydrofurane, is treated with 1.15 g of triphenylphosphine and 0.35 ml of pryidine, and the mixture is warmed for 2 hours at 50°C and then evaporated to dryness. The residue is chromatographed on 30 g of pure silica gel, and elution with a 1:1 mixture of toluene and acetic acid ethyl ester yields α-{2-oxo-3β-(N-phenylacetyl-amino)-4β-[2-(2,2,2-trichlorethoxycarbonyloxy)-ethylmercapto]-1-azetidinyl}-α-triphenylphosphoranylidene-acetic acid tert.-butyl ester, which is contaminated with a little triphenylphosphine oxide and which can be purified by means of preparative thin layer chromatography (silica gel; development with iodine); Rf≈0.57 (system: toluene/acetone, 1:1); infrared absorption spectrum (in methylene chloride): characteristic bands at 3.00µ, 3.42µ, 5.68µ, 5.97µ, 6.10µ and 6.65µ.

A mixture of 0.225 g of α-{2-oxo-3β-(N-phenylacetyl-amino)-4β-[2-(2,2,2-trichlorethoxycarbonyloxy)-ethylmercapto]-1-azetidinyl}-α-triphenylphosphoranylidene-acetic acid tert.-butyl ester in 10 ml of a 9:1 mixture of acetic acid and water is treated with 3.0 g of zinc dust and stirred for 45 minutes at 15° C. The mixture is filtered and the filtrate is evaporated; the residue is taken up in 50 ml of acetic acid ethyl ester and the solution is washed with 25 ml of a saturated aqueous sodium hydrogen carbonate solution and twice washed with 25 ml portions of a saturated aqueous sodium chloride solution, dried over sodium sulphate and evaporated. α-[4β-(2-Hydroxyethylmercapto)-2-oxo-3β-(N-phenylacetyl-amino)-1-azetidinyl]-α-triphenylphosphoranylidene-acetic acid tert.-butyl ester is thus obtained; thin layer chromatogram (silica gel; development with iodine): Rf≈0.24 (system: toluene/acetone, 1:1).

A mixture of 0.221 g of the crude α-[4β-(2-hydroxyethylmercapto)-2-oxo-3β-(N-phenylacetylamino)-1-azetidinyl]-α-triphenylphosphoranylidene-acetic acid tert.-butyl ester in 5 ml of dimethylsulphoxide and 5 ml of acetic anhydride is left to stand for 16 hours at room temperature and is then concentrated under reduced pressure. The residue is taken up in 100 ml of toluene; the organic solution is washed three times with 50 ml portions of distilled water, dried over sodium sulphate and evaporated. The oily residue is chromatographed on 10 g of silica gel; the desired 7-(N-phenylacetyl-amino)-ceph-3-em-4-carboxylic acid tert.-butyl ester, which forms by cyclization from the α-[4β-formylmethylmercapto-2-oxo-3β-(N-phenylacetyl-amino)-1-azetidinyl]-α-triphenylphosphoranylidene-acetic acid tert.-butyl ester which is obtained as an intermediate and is not isolated, is eluted with a 4:1 mixture of toluene and acetic acid ethyl ester; thin layer chromatogram (silica gel): Rf≈0.48 (system: toluene/acetic acid ethyl ester, 1:1); ultraviolet absorption spectrum (in pure ethanol): $\lambda_{max}$ 258 mµ; infrared absorption spectrum (in methylene chloride): characteristic bands at 3.00µ, 3.48µ, 5.62µ, 5.81µ, 5.93µ, 6.10µ, 6.67µ, 7.15µ, 7.31µ, 7.70µ, 8.65µ and 9.03µ.

A mixture of 0.03 g of 7-(N-phenylacetyl-amino)-ceph-3-em-4-carboxylic acid tert.-butyl ester and 0.5 ml of trifluoracetic acid is left to stand for 1 hour at room temperature. The trifluoracetic acid is then removed under reduced pressure and the residue is twice evaporated to dryness with 5 ml portions of a mixture of benzene and chloroform. The residue is chromatographed on 5 g of silica gel and the 7-(N-phenylacetyl-amino)-ceph-3-em-4-carboxylic acid is eluted with methylene chloride containing 5 percent of acetone; thin layer chromatogram (silica gel: development with iodine: Rf≈0.49 (system: n-butanol/pyridine/acetic acid/water, 40:24:6:30).

I claim:

1. 4,4-Dimethyl-5-thia-2,7-diazabicyclo[4.2.0]oct-2-en-8-one of formula

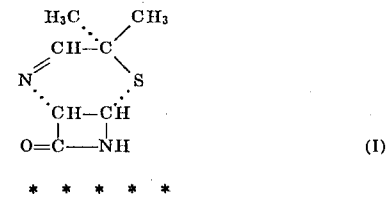

(I)

* * * * *